Patented July 14, 1931

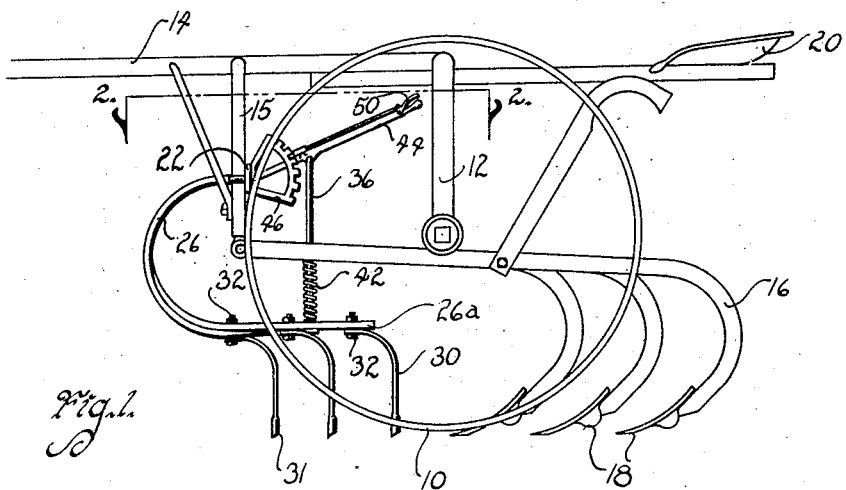
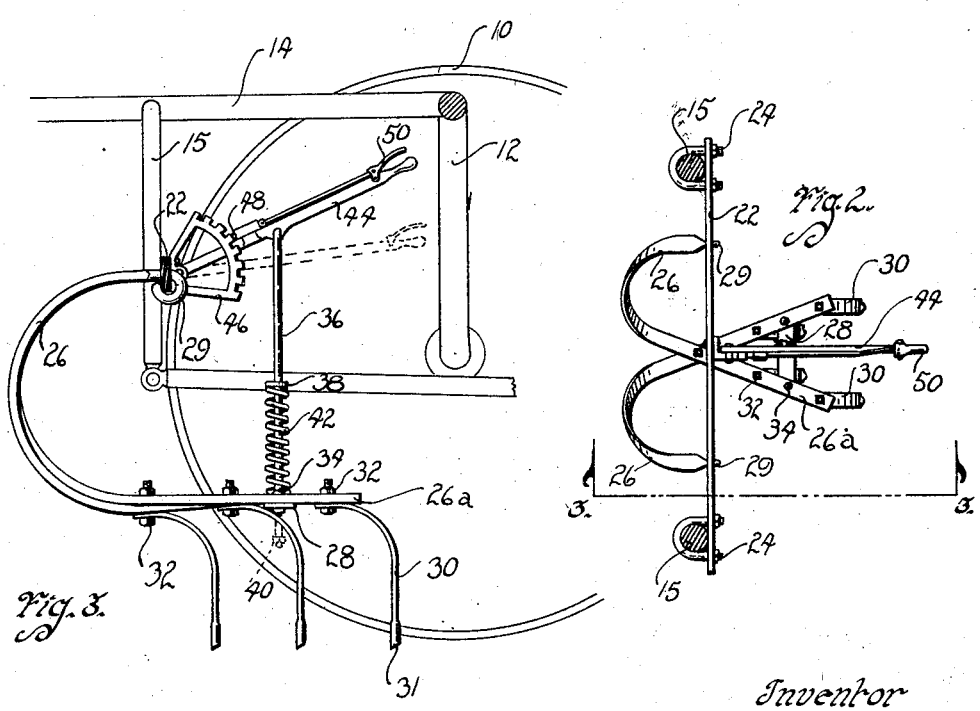

1,814,404

UNITED STATES PATENT OFFICE

JOHN MURPHY, OF JEFFERSON, IOWA

WEEDER ATTACHMENT

Application filed October 28, 1929. Serial No. 402,934.

The object of my invention is to provide a weeder attachment for cultivators of simple, durable and comparatively inexpensive construction.

A further object of my invention is to provide a weeder attachment, the parts of which are mounted on a supporting bar, the bar, itself, being adapted for quick and easy attachment to the frame of a cultivator. The attachment is provided with downwardly extending weeder teeth, adapted to agitate the soil and extract weeds therefrom, and is especially adapted for the extraction of morning glory vines.

More particularly it is my object to provide a supporting bar with teeth bars pivoted thereto, extending forwardly, downwardly, and rearwardly, the teeth bar crossing at one point and then diverging rearwardly with the weeder teeth attached to the teeth bars, and extending downwardly and rearwardly therefrom.

Another object is to provide a control lever, suitably attached to the weeder bars, for controlling the weeder teeth, relative to the ground surface.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a side elevation of a cultivator, illustrating my weeder attachment applied thereto.

Figure 2 is a plan view of the weeder attachment, showing portions of the cultivator in section on the line 2—2 of Figure 1; and Figure 3 is a sectional view on the line 3—3 of Figure 2.

On the accompanying drawings, I have used the reference numeral 10 to indicate the wheels of a cultivator. A yoke shaped axle 12 is usually provided on which the wheels 10 are rotatably mounted. A tongue 14 extends forwardly from the axle 12.

Shovel beams 16 extend rearwardly from a yoke 15 of the cultivator, and have cultivator shovels 18 secured thereto. The cultivator seat is indicated at 20.

My weeder attachment consists of a supporting bar 22 adapted to be secured to the yoke 15 by U bolts 24. A pair of teeth bars 26 have eye shaped ends 29 adapted to extend through spaced openings in the supporting bar 22, whereby the teeth bars are pivotally mounted on the supporting bar 22.

The teeth bars 26 extend forwardly, downwardly, and rearwardly in the form of a curve and their rearward extending portions are indicated at 26a. The teeth bars 26 cross at the forward ends of the portions 26a. A cross bar 28 extends between the teeth bars 26. At the point where the teeth bars cross, at the rear ends of the teeth bars and at intermediate positions, I provide weeder teeth 30.

The weeder teeth 30 are of the shape shown in Figures 1 and 3, being flat for the major portions of their length and rounded at their lower ends as indicated at 31. Bolts 32 are provided for attaching the upper ends of the weeder teeth to the teeth bars, such upper ends being perforated for this purpose.

The cross bar 28 is secured to the portions 26a of the teeth bars 26 by rivets 34. A central opening is provided in the cross bar 28 for a rod 36 to extend through. A shoulder 38 is formed on the rod 36 above the cross bar 28 and a stop nut 40 positioned on the rod below the bar. A spring 42 is interposed between the shoulder 38 and the bar 28.

The upper end of the rod 36 is pivotally connected with a control lever 44 which in turn is pivoted to a notched sector 46. A dog 48 is adapted to selectively coact with the notches of the sector 46 and may be withdrawn from them by depressing a finger 50.

*Practical operation*

In the operation of my device, after it is attached to a cultivator, it may be caused to assume the positions shown in Figures 1 and 3 to act as a weeder. If desirable, a spring pressure may be imposed to force the teeth 30 into the ground by moving the lever 44 to the dotted line position shown in Figure 3. When it is desired to raise the teeth out of the ground, the lever 44 may be adjusted toward the top of the sector 46 whereby the weeder is rendered inoperative during cultivator operations or when driving the cultivator from one field to another etc.

It will be noted that the weeder teeth 30 are located in front of the cultivator shovels 18. By locating the teeth in this position they engage morning glory vines and pull them out of the ground after which the shovels 18 bury the vines and prevent their further growth. I have found my device very effective for this purpose.

Some changes may be made in the construction and arrangement of the parts of my device without departing from the real spirit and purpose of my invention and it is my intention to cover by my claims, any modified forms of structure or use of mechanical equivalents which may be reasonably included within their scope.

I claim as my invention:

1. In a weeder attachment for cultivators, a supporting bar adapted to be secured to the frame of a cultivator, a weeder frame comprising a pair of teeth bars pivoted at spaced points on said supporting bar, curved forwardly, downwardly and rearwardly, the rearward extending portions being crossed and weeder teeth extending downwardly from the rearwardly extending portions, said teeth starting at the crossing point whereby they are arranged in V formation.

2. In a weeder attachment for cultivators, a supporting bar adapted to be secured to the frame of a cultivator, a weeder frame comprising a pair of teeth bars pivoted to the supporting bar and crossing at one point, the teeth bars extending rearwardly and diverging whereby a V shaped supporting frame for weeder teeth is provided, a cross bar across the teeth bars, weeder teeth extending from the teeth bars, and means for securing the weeder teeth to the teeth bars.

Des Moines, Iowa, September 20, 1929.

JOHN MURPHY.